Aug. 7, 1956 R. H. RUSSELL 2,757,827
LIQUID DISPENSING APPARATUS
Filed Nov. 13, 1953
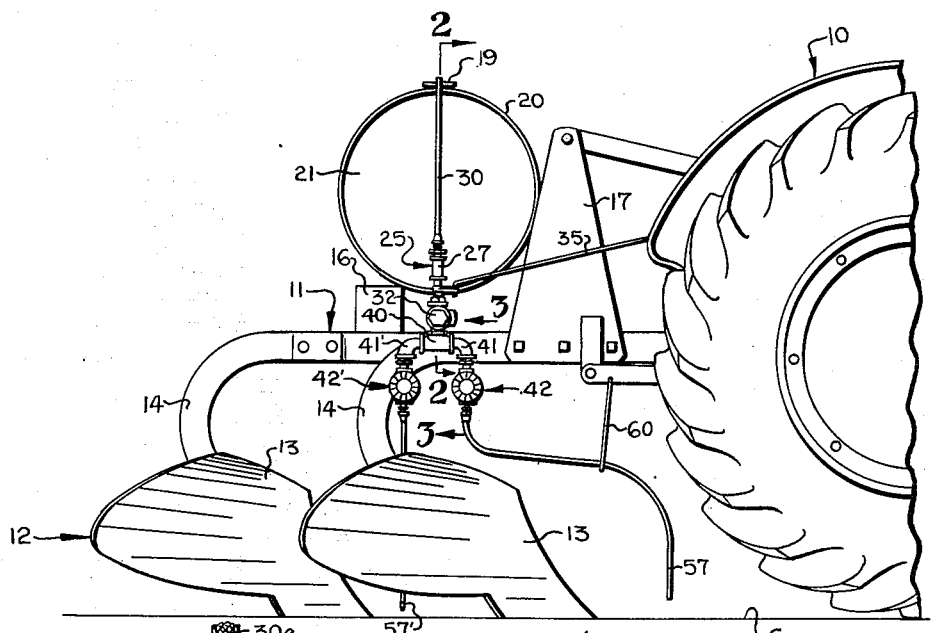
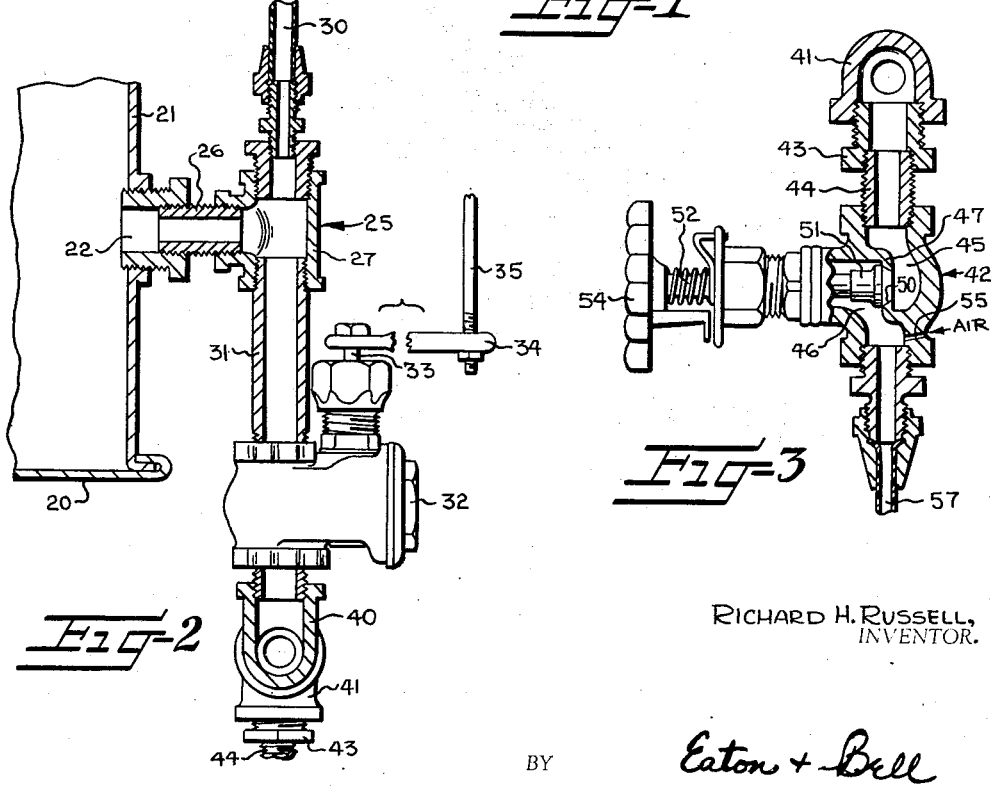
RICHARD H. RUSSELL,
INVENTOR.
BY Eaton + Bell
ATTORNEYS United States Patent Office 2,757,827
Patented Aug. 7, 1956

2,757,827
LIQUID DISPENSING APPARATUS
Richard H. Russell, Charlotte, N. C.
Application November 13, 1953, Serial No. 391,834
5 Claims. (Cl. 222—482)

This invention generally relates to liquid dispensing devices of the gravity feed type and, more especially, to a liquid flow control apparatus particularly adapted for use in conjunction with various agricultural operations.

It is the primary object of this invention to provide an improved liquid dispensing device or apparatus particularly adapted for use with tillage implements or other farm implements for directing liquid from a tank to the soil or vegetation to which the liquid is to be applied, by gravity, and wherein a uniform amount of liquid will be dispensed at all times regardless of the amount of liquid in the tank.

As is well known, whenever liquid is dispensed through an outlet in the lower portion of a tank or reservoir, the liquid will flow at a relatively faster rate when the tank contains a large volume of liquid than it will when the tank is nearly empty, due to the pressure effected by the weight of the liquid. When spraying vegetation or soil, while moving the tank or reservoir over the ground, it is evident that this results in the portions of the soil or plants over which the spraying or dispensing device is moved, when the reservoir has a substantially large amount of liquid therein, receiving a substantially greater amount of liquid than the portions of the soil or vegetation will receive when the tank of the dispensing device is nearly empty, because the pressure of the liquid would gradually decrease as it was dispensed from the tank or reservoir.

It is therefore another object of this invention to overcome such defects as above disclosed or described by providing a sealed tank or reservoir with an improved dispensing device wherein a nipple is connected to the outlet opening of the tank or reservoir and to which a pipe fitting is connected and wherein the pipe fitting has an air inlet tube or branch, connected thereto and extending upwardly therefrom, which is open at its upper end and has a substantially less internal cross-sectional area than the internal cross-sectional area of the nipple or the pipe fitting connected to the nipple. Thus, the air inlet pipe admits a relatively smaller amount of air into the nipple and the reservoir than would ordinarily be displaced by the liquid passing through the nipple. This limits the amount of liquid which may pass from the tank, through the outlet opening and into the pipe fitting. The pipe fitting on the outer end of the nipple also has a downwardly extending branch pipe connected thereto which may have an internal cross-sectional area substantially the same as, or slightly greater than, the cross-sectional area of the nipple, and which preferably has a manually operable valve interposed therein. The lower end of the last-named branch pipe depending from the pipe fitting is connected to one side of a valve or fitting, to the other side of which a relatively small tube or pipe having a relatively small cross-sectional area, as compared to the cross-sectional area of the nipple and the intervening pipe connections, is connected and which is open at the lower end thereof, for directing the liquid to the desired area.

The valve to which the upper end of the discharge pipe is connected has a relatively small air inlet opening or pin hole therein so that any agitation of the liquid, caused at the tank outlet as the liquid passes through the nipple, is overcome due to the admittance of air into the pipe line at the point at which the liquid passes into the upper end of the discharge pipe. Thus, since the first air inlet is disposed above the point at which the liquid enters the pipe line and the second air inlet is disposed substantially below the point at which the liquid enters the pipe line, a constant head pressure is maintained and the liquid is then uniformly and evenly dispensed from the open lower end of the discharge pipe, regardless of the amount of liquid in the tank or reservoir.

The pressure of the liquid moving past the second air inlet opening or pin hole is such that it will cause air to be drawn into the opening, instead of the liquid passing outwardly through the second air inlet or pin hole except, perhaps, when the flow of the liquid is initiated.

Some of the objects of the invention having been stated, other objects will appear as the description proceeds, when taken in connection with the accompanying drawings in which—

Figure 1 is a side elevation of the rear portion of a tractor or prime mover showing a farm implement connected to the rear end thereof and on which the improved dispensing apparatus is mounted;

Figure 2 is an enlarged fragmentary vertical sectional view through the dispensing apparatus taken substantially along the line 2—2 in Figure 1;

Figure 3 is a fragmentary vertical sectional view taken substantially along line 3—3 in Figure 1.

Referring more specifically to the drawings, the letter G indicates the ground along which a tractor or prime mover 10 moves and only a rear portion of which is shown in Figure 1. Suitably connected to the rear end of the tractor 10 is a framework broadly designated at 11 which supports a farm implement broadly designated at 12. In this instance, the farm implement 12 is shown in the form of a plow having plowshares 13 which are connected to the lower ends of curved arms 14 whose upper ends are connected to the framework 11.

The framework 11 includes a pair of upwardly projecting forwardly and rearwardly spaced frame members 16 and 17, upon and between which a suitable liquid supply tank or reservoir 20 is mounted. The tank 20 is adapted to contain a supply of liquid to be applied onto the ground G or to the stalks of plants, the liquid being omitted from the drawing for purposes of clarity. In order to introduce liquid into the tank or reservoir 20, the tank is provided with an opening which is sealed by a removable cover 19, thus preventing air from entering the tank 20 other than by means of the improved dispensing or flow control apparatus to be presently described. The tank or reservoir 20 may be of any desired construction and includes a side wall or end wall 21 having a discharge outlet opening 22 adjacent the lower portion thereof to which the improved gravity feed flow control apparatus, broadly designated at 25, is connected by means of a relatively short pipe or close nipple 6.

The other end of the nipple 26 is connected to one branch of a pipe T 27 which may be supplemented by any suitable pipe fitting having branches thereon. The upper branch of the pipe T has the lower end of a first air inlet pipe 30 coupled thereto, which is preferably made from a transparent material, such as plastic or glass to thereby serve as a sight tube; indicating the amount of liquid in the tank 20. The air inlet pipe is open at its upper end and necessarily extends upwardly and terminates on a level above the maximum level of the liquid in the tank 20.

The lower branch of the pipe T 27 has a series of pipe elements or a plurality of sets of pipe connections, to be later described, communicating therewith, through an intervening pipe 31 whose upper end is coupled to said lower branch of pipe 27. The pipe 31 extends downwardly and has a suitable manually operable master control valve or shut-off valve 32 interposed therein which has a movable stem 33 projecting upwardly therefrom to which an arm 34 is secured.

The outer end of the arm 34 has the rear end of a link 35 pivotally connected thereto which, as shown in Figure 1, extends forwardly and terminates within reach of the operator of the tractor 10 to facilitate opening and closing the valve 32, as desired. The lower end of the pipe line 31, below the valve 32, is connected to a manifold pipe fitting which is shown in the form of a pipe T 40 and has a plurality of pipe fittings connected thereto which, in this instance, are shown in the form of pipe elbows.

Since the manifold pipe fitting 40 is shown in the form of a pipe T, the two horizontal branches thereof have the proximal ends of pipe elbows 41 and 41' connected thereto. The pipe elbows 41 and 41' extend outwardly and curve downwardly and have respective manually operable valve units broadly designated at 42 and 42' connected thereto. Since the valve units 42 and 42' and the parts connected thereto are identical, only the valve unit 42 and associated parts will be described in detail and like parts of the valve unit 42', which are visible, will bear the same reference characters with the prime notation added. It will be observed in Figure 3 that the valve unit 42 is coupled to the pipe elbow 41 by means of a screw fitting or adapter 43 and a relatively short pipe or close nipple 44. The housing of the valve unit 42 has ingress and egress chambers 45 and 46, respectively, therein which are defined by a partition 47 having a valve seat opening 50 therein which is adapted to be engaged by a valve 51. The valve 51 is fixed on a valve stem 52 rotatably mounted in the housing of valve unit 42 and having a suitable hand wheel 54 fixed on its outer end to facilitate manual opening and closing of valve 51 in the opening 50.

Now, an important feature of the invention is the provision of a relatively small second air inlet opening or pin hole 55 in the housing of the valve unit 42 which establishes communication between the atmosphere and the lower chamber 46 adjacent the discharge end of the housing of valve unit 42. Suitably coupled to the lower end of the valve unit 42, and communicating with the lower chamber 46, is a liquid discharge pipe 57 which preferably has a relatively smaller internal cross-sectional area than the internal cross-sectional area of any of the pipe fittings between the tank outlet 22 and the tube or pipe 57.

The pipes 57 and 57' are preferably made from a pliable material such as plastic, copper tubing or the like and may be of varying lengths as illustrated in Figure 1 so the lower open or discharge ends thereof may be positioned as desired relative to the operating parts of the farm implement 12. Also, the pipes 57 and 57' are preferably transparent or translucent so the operator of the tractor may be able to determine, at a glance, whether liquid is flowing through these pipes. In this instance, the discharge pipe or tube 57' extends downwardly in a straight line from the valve unit 42' while the discharge pipe or tube 57 is curved forwardly and then downwardly and terminates in spaced relation above the level of the ground G. In order to support the discharge pipe or tube 57, a suitable cord or other pliable or rigid connection 60 may be provided between the framework 11 and the medial portion of the discharge pipe or tube 57 as shown in Figure 1.

Now, it is evident that, when only a single discharge pipe, such as the discharge pipe 57, is used, one or other of the valves 42 or 32 may be omitted. The reason why the two valves 42 and 42' are provided is to enable the operator to stop the flow of liquid from the tank 20 through either of the discharge pipes 57 or 57' without stopping the flow of liquid through the other of the discharge pipes. While it is preferable that the second air inlet 55 is provided in a valve unit, such as the valve unit 42, it is to be understood that any desired type of pipe fitting may be employed in lieu of the valve unit 42 and provided with the air inlet 55 adjacent the point at which the upper end of the discharge pipe or conduit 57 is connected thereto, the valve unit 42 being deemed the equivalent of any suitable pipe fitting. The valve units 42 and 42' also serve as regular valves.

The primary requisite to control the proper flow of the liquid from the tank 20 through the discharge pipe 57 is that the first air inlet, as defined by the air inlet pipe 30, should be disposed on a level above that at which the liquid enters the improved flow control apparatus and the second air inlet opening should be disposed substantially below the point at which the liquid enters the pipe system or flow control apparatus.

*Method of operation*

Assuming the master control valve 32 to be closed, as the tank or reservoir 20 is filled with liquid, the liquid flows through the discharge opening or outlet 22, in the wall 21 of tank 20, and enters the pipe fittings 26, 27 and the portion of pipe 31 disposed above the valve 32. It is evident that the liquid will also occupy a level in the air inlet pipe 30 substantially coincident with the level of the liquid in the tank 20. In order to prevent the liquid from overflowing or gushing out of the open upper end of the pipe 30 as the tank 20 is being filled with liquid, and to also filter the air entering the upper end of the air inlet pipe 30, it is preferable that a suitable filter means, such as steel wool, is positioned in the open upper end of the pipe 30, this filter being shown in Figure 2 and indicated at 30a.

Although the filter 30a may not be completely effective to prevent the liquid from overflowing the pipe 30, the filter 30a retards the pressure of the liquid as it enters the pipe 30 to such an extent that it will not gush or spurt out of the open upper end of the tube 30. Of course, if the tank or reservoir 20 is filled relatively slowly, the filter 30a may be omitted.

Now, assuming the tank 20 to be substantially filled with liquid and the cover 19 secured in position tight enough to seal the tank 20, with the exception of the outlet 22, and also assuming that the valve 51 (Figure 3) is in open position relative to the opening 50, the operator then moves the tractor 10 and farm implement 12 over the ground G and opens the valve 32. When the valve 32 is initially opened, the liquid first flows from the pipe 30 into the pipe 31 and when all of the liquid is emptied from the pipe 30, the liquid will commence flowing through the outlet 22 in the wall 21 of tank 20 and thus into the flow control apparatus 25.

The air inlet pipe 30 has a substantially smaller internal cross-sectional area than that of the nipple 26 and will thereby retard the flow of the liquid through the nipple 26 since the amount of air entering the tank 20 is not sufficient to displace the liquid in the tank 20 at the rate that it would normally flow due to its own weight. The limited amount of air entering the tank 20 through the tube 30 and nipple 26 creates a partial vacuum within the tank 20, and it is evident that this reduces the head pressure of the liquid entering the flow control apparatus 25 from the tank 20. It is important that the cross-sectional area of tube 30 be small enough to create a partial vacuum within tank 20, yet not so small as to create a sufficient vacuum to stop the flow of liquid.

Thus, by creating a partial vacuum within the tank liquid is delivered at a constant rate from the tank 20, whether the tank be full or nearly empty, through the open valves 32 and 42 to the discharge pipe 57.

Now, as the liquid originally flows past the second air inlet opening 55, a relatively small amount of the liquid may seep through the air inlet opening 55 and be discharged therefrom. However, the continued flow of the liquid past the opening 55 creates a suction in the opening 55 and causes air to be drawn into the opening and introduced into the foot of the liquid column, thereby eliminating agitation of the liquid within the discharge pipe 57 and causing it to be emitted from pipe 57 in a steady stream. The provision of opening 55 also permits the liquid to be emptied from the discharge pipe 57 upon either of the valve units 42 or 32 being closed.

The cross-sectional area of opening 55 is critical to the extent that it must be small enough to prevent the liquid from flowing out of it and just large enough to introduce atmospheric pressure into the liquid column as it enters the discharge pipe to cause the liquid to be emitted from the discharge pipe 57 in a steady stream.

The introduction of atmospheric pressure into the liquid column adjacent the discharge pipe 57 does not affect the partial vacuum created within the tank 20 by the air inlet 30. This is so because the liquid column itself seals off the atmospheric pressure which enters through the opening 55 from communication with the tank 20.

The partial vacuum set up within the tank 20 by the air inlet 30 results in a constant volume of liquid being delivered to the discharge pipe 57 and the air inlet 55 which introduces atmospheric pressure into the top of the discharge pipe causes the liquid to be dispensed at a steady rate rather than intermittently.

It is thus seen that I have provided an improved apparatus for controlling the flow of liquid from the reservoir or tank 20 by gravity in such a manner as to insure that the rate at which the liquid is discharged from the open lower end of either or both of the discharge pipes 57 and 57' remains constant regardless of variations in pressure of the liquid in the tank 20 resulting from the gradually decreasing weight of the liquid in the tank 20 as it is emptied from the tank through the outlet 22.

In the drawings and specification there has been set forth a preferred embodiment of the invention and although specific terms are employed, they are used in a generic and descriptive sense only, and not for purposes of limitation, the scope of the invention being defined in the claims.

I claim:

1. An improved liquid dispensing apparatus comprising a closed liquid supply tank having an outlet opening therein, a pipe fitting communicatively connected to the outlet opening and having upper and lower branches, an air inlet pipe, open at its upper end, communicatively connected to the upper branch of said pipe fitting and extending upwardly therefrom and terminating on a level above the level of the liquid in said supply tank, a discharge pipe having an open lower end and being disposed below the level of said outlet opening, pipe connections between the lower branch of said pipe fitting and the upper end of the discharge pipe, one of said pipe connections having a relatively small air inlet opening therein spaced substantially below the level of the outlet opening, and said air inlet pipe having a relatively smaller cross-sectional internal area than the cross-sectional area of the outlet opening, the internal cross-sectional area of the fitting, and the internal cross-sectional area of said pipe connections.

2. An improved liquid dispensing apparatus comprising a closed liquid supply tank having an outlet opening therein, a pipe T communicatively connected to the tank at said outlet opening, an air inlet pipe connected at its lower end to said pipe T and having its open upper end terminating on a level above the maximum level of the liquid in said tank, a second pipe also communicatively connected to said pipe T, a valve unit communicatively connected to the end of the second pipe remote from the pipe T, a discharge tube connected to the end of the valve unit remote from the end thereof which is connected to the second pipe, said discharge pipe being open at its lower end, said valve unit including a housing having upper and lower chambers therein communicating with the second pipe and the discharge pipe, respectively, a partition in said housing defining said upper and lower chambers and having a valve seat opening therein, a valve member adapted to open and close said valve seat opening, and a relatively small air ingress opening in the housing establishing communication between the lower chamber and the atmosphere.

3. A structure according to claim 2 wherein the internal cross-sectional area of the air ingress pipe is substantially less than the internal cross-sectional area of each the outlet opening of the tank, the pipe T, the second pipe, the chambers in said housing and the valve seat opening.

4. In a liquid dispensing apparatus having a sealed liquid supply tank provided with a liquid outlet opening adjacent its lower portion; a liquid flow control apparatus including a first pipe connected to said tank and communicating with said outlet opening, a series of pipe elements connected with said first pipe and having a first air inlet opening therein disposed above the level of said liquid outlet opening, said pipe elements also having at least one second air inlet opening therein spaced below the level of said liquid outlet opening, the cross-sectional area of said first air inlet opening being greater than that of said second air inlet opening, and at least one liquid discharge pipe, open at its lower end, connected at its upper end to one of said pipe elements at a point below the level of said second air inlet opening.

5. In a liquid dispensing apparatus having a liquid supply tank provided with an outlet opening in its lower portion; the combination of liquid flow control apparatus for maintaining a constant rate of flow comprising a pipe fitting communicatively connected to the outlet opening and having upper and lower branches, said upper branch of said pipe fitting extending above the maximum level of the liquid within the tank and having a first air inlet opening in the upper end thereof, a discharge pipe having an open lower end and being disposed below the level of said outlet opening, means communicatively connecting the upper end of said discharge pipe to said lower branch of the pipe fitting, said means having a second air inlet opening therein spaced below the level of the outlet opening and being of smaller cross-sectional area than said first air inlet opening, and said first air inlet opening having a relatively smaller cross-sectional area than the cross-sectional area of said outlet opening, the internal cross-sectional area of said pipe fitting and the internal cross-sectional area of said connecting means.

References Cited in the file of this patent
UNITED STATES PATENTS

| | | |
|---|---|---|
| 493,877 | Schlueter | Mar. 21, 1893 |
| 1,665,490 | Aebli | Apr. 10, 1928 |
| 2,509,130 | Burks | May 23, 1950 |